US005464336A

United States Patent [19]
Planeta

[11] Patent Number: 5,464,336
[45] Date of Patent: Nov. 7, 1995

[54] AIR RINGS FOR COOLING BLOWN PLASTIC FILM

[76] Inventor: Mirek Planeta, 170 Traders Blvd., Mississauga, Canada, L4Z 1W7

[21] Appl. No.: 289,036

[22] Filed: Aug. 11, 1994

[51] Int. Cl.⁶ .................................... B29C 47/88
[52] U.S. Cl. ................. 425/72.1; 425/192 R; 425/326.1
[58] Field of Search .............................. 425/72.1, 326.1, 425/387.1, 192 R

[56] References Cited

U.S. PATENT DOCUMENTS

| | | | |
|---|---|---|---|
| 3,819,790 | 6/1974 | North et al. | 425/326.1 X |
| 4,717,323 | 1/1988 | Karl et al. | 425/387.1 X |
| 4,818,467 | 4/1989 | Audureau et al. | 425/72.1 X |
| 4,826,414 | 5/1989 | Planeta | 425/72.1 |
| 4,929,162 | 5/1990 | Planeta | 425/72.1 |

Primary Examiner—Richard L. Chiesa
Attorney, Agent, or Firm—Rogers & Scott

[57] ABSTRACT

An air ring for supplying cooling air to an extruded tubular plastic film after the film has been extruded from an annular extruder die at an elevated temperature. The air ring has a lower annular member securable to an annular extruder so as to surround extruded tubular plastic film as the film leaves the extruder die. The lower annular member having at least one passage therethrough for supplying cooling air from the exterior thereof to a lower portion of the tubular film. A first upper annular member surrounds an upper portion of the lower annular member in radially spaced relationship therewith, the first upper annular member projecting above the lower annular member and being detachably secured to the upper portion of the lower annular member by a removable spacer assembly, which provides circumferentially extending passages for the flow of cooling air from the ambient atmosphere between the lower annular member and the first upper annular member to the tubular film.

3 Claims, 1 Drawing Sheet

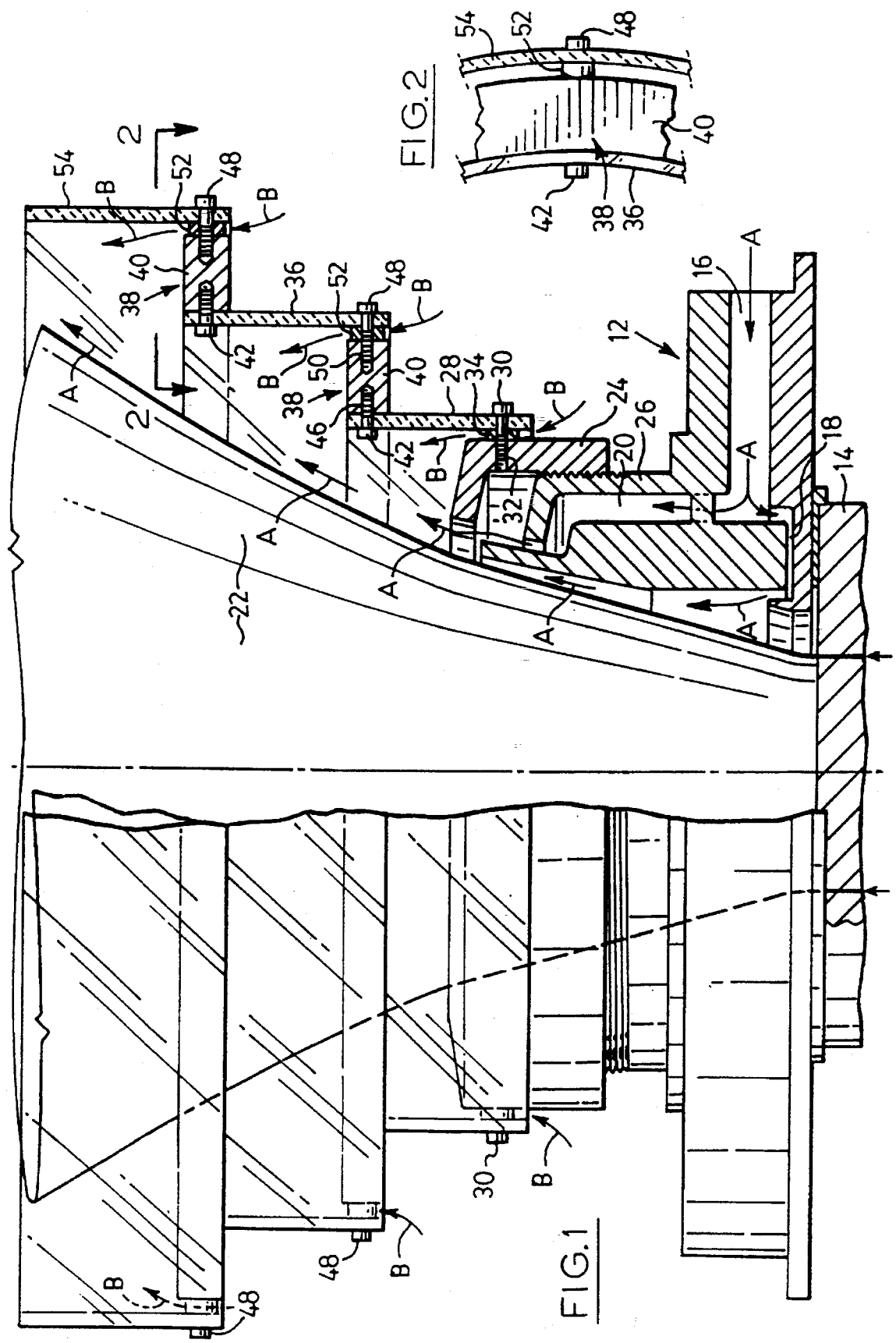

AIR RINGS FOR COOLING BLOWN PLASTIC FILM

This invention relates to air rings for cooling blown plastic film, that is to say air rings for supply cooling air to an extruded tubular plastic film after the film has been extruded from an annular extruder die at an elevated temperature, i.e. above ambient temperature.

Air rings of this kind are described for example in my prior U.S. Pat. No. 4,826,414 issued May 2, 1989 and my prior U.S. Pat. No. 4,929,162 issued May 29, 1990, the contents of which are hereby incorporated herein by reference. Such air rings function in a satisfactory manner but are somewhat difficult to manufacture and are consequently expensive.

It is therefore an object of the present invention to provide an air ring which functions in a satisfactory manner but which is simpler to manufacture and hence less expensive than previously known air rings.

According to the present invention, an air ring comprises a lower annular member securable to an annular extruder die so as to surround extruded tubular plastic film as the film leaves the extruder die, said lower annular member having at least one passage therethrough for supplying cooling air from the exterior thereof to a lower portion of the tubular film, a first upper annular member surrounding an upper portion of the lower annular member in radially spaced relationship therewith, said first upper annular member projecting above the lower annular member and being detachably secured to the upper portion of the lower annular member by a removable spacer assembly, which provides circumferentially extending passages for the flow of cooling air from the ambient atmosphere between the lower annular member and the first upper annular member to the tubular film.

The removable spacer assembly may comprise a series of circumferentially spaced securing devices each carrying an annular spacer thereon to maintain said radially spaced relationship.

The air ring may also include a second upper annular member surrounding an upper portion of the first upper annular member in radially spaced relationship therewith, said second upper annular member projecting above the first upper annular member and being detachably secured to the upper portion of the first upper annular member by a further removable spacer assembly, which provides circumferentially extending passages for the flow of cooling air from the ambient atmosphere between the first upper annular member and the second upper annular member to the tubular film.

The further removable spacer assembly may comprise a spacer ring secured to one of the members and a series of circumferentially spaced securing devices securing the spacer ring to the other member, each securing device carrying an annular spacer.

BRIEF DESCRIPTION OF THE DRAWINGS

One embodiment of the invention will now be described, by way of example, with reference to the accompanying drawings, of which:

FIG. 1 is a side view, partly in section, of an air ring in accordance with the invention secured to an annular extruder die, and FIG. 2 is a horizontal sectional view taken along the line 2—2 of FIG. 1.

DETAILED DESCRIPTION OF PREFERRED EMBODIMENTS

Referring to the drawings, an air ring comprises a lower annular member 12 secured in known manner to an annular extruder die 14. The lower annular member 12 has passages 16, 18, 20 for supplying cooling air to a lower portion of the extruded tubular plastic film 22. The arrangement as so far described is substantially as described and illustrated in my prior U.S. Pat. Nos. 4,826,414 and 4,929,162 previously referred to, except that the upper portion of the lower annular member 12 is an auxiliary lower annular member 24 which is screwed on to the lower portion 26 thereof. The auxiliary lower annular member 24 may conveniently be made of aluminum.

In accordance with the present invention, and in contrast to the arrangements described and illustrated in my two prior patents referred to above, a first upper cylindrical member 28 having a cylindrical configuration surrounds the auxiliary lower annular member 24 in radially spaced relationship therewith. The first upper cylindrical member 28 projects above the lower annular member 12 and is detachably secured to the auxiliary lower annular member 24 by a series of circumferentially spaced screws 30 which pass through apertures in the lower portion of the first upper cylindrical member 28 into tapped bores 32 in the auxiliary lower annular member 24. Annular spacers 34 surround the screws 30 between the first upper cylindrical member 28 and the auxiliary lower annular member 24 to provide circumferentially extending passages therebetween. The first upper cylindrical member 28 may conveniently be made of a suitable transparent material, such as transparent acrylic plastic material, for example Plexiglass (TM). Typically, there will be from four to six circumferentially spaced sets of screws 30 and annular spacers 34, depending on the diameter of the members concerned.

A second transparent upper cylindrical member 36 surrounds the upper portion of the first upper cylindrical member 28 in spaced relationship therewith. The second upper cylindrical member 36 projects above the first upper cylindrical member 28 and is detachably secured thereto by a spacer assembly 38. The spacer assembly 38 comprises an aluminum spacer ring 40 detachably secured to the upper portion of the first upper cylindrical member 28 by screws 42 which pass through apertures in the first upper cylindrical member 28 into tapped bores 46 in the radially inner side of the spacer ring 40. The lower end portion of the second upper cylindrical member 36 is detachably secured to the spacer ring 40 by circumferentially spaced screws 48 which pass through apertures in the second upper cylindrical member 36 into tapped bores 50 in the radially outer side of the spacer ring 40, annular spacers 52 surrounding screws 48 between the second upper cylindrical member 36 and the spacer ring 40 to provide circumferentially extending passages between the second upper cylindrical member 36 and the spacer ring 40. Typically, there will be four to six circumferentially spaced sets of screws 42, 48 and annular spacers 52, depending on the diameters of the members concerned.

In this embodiment, a third transparent upper cylindrical member 54 is also provided and is detachably secured to the second upper cylindrical member 36 in the same manner as the second upper cylindrical member 36 is detachably secured to the first upper cylindrical member 28, i.e. by a spacer assembly 38 comprising spacer ring 40, screws 42, screws 48 and annular spacers 52.

In use, as the tubular plastic film 22 is extruded upwardly from extruder die 14 as an expanding air-filled bubble, cooling air supplied to the lower annular member 12 passes through passages 16, 18 and 20 into contact with and upward movement with the plastic film 22, as indicated by arrows A, to cool and stabilize the film bubble. Such upward movement also causes ambient air to pass upwardly, as indicated by arrows B, through the circumferentially extending passages between the auxiliary lower annular member 24 and the first upper cylindrical member 28, between the first upper cylindrical member 28 and the second upper cylindrical member 36, and between the second upper cylindrical member 36 and the third upper cylindrical member 54, to further cool and stabilize the film bubble.

It will be readily apparent to a person skilled in the art from the foregoing description of a preferred embodiment that an air ring in accordance with the present invention can be more easily adjusted for different blow-up ratios than previously known air rings. It is a relatively easy matter to remove existing upper annular members and replace them with upper annular members of other diameters and different size spacer assemblies.

In the described embodiment, the presence of transparent upper annular members enables the portion of the film bubble within the upper part of the air ring to be easily observed so that any consequent necessary adjustments to the extruding process can be made promptly.

Other embodiments of the invention will also be clearly apparent to a person skilled in the art, the scope of the invention being defined in the appended claims.

I claim:

1. An air ring for supplying cooling air to an extruded tubular plastic film after the film has been extruded from an annular extruder die at an elevated temperature, said air ring comprising:

a lower annular member securable to an annular extruder die so as to surround extruded tubular plastic film as the film leaves the extruder die, said lower annular member having at least one passage therethrough for supplying cooling air from the exterior thereof to a lower portion of the tubular film, and a first upper annular member surrounding an upper portion of the lower annular member in radially spaced relationship therewith, said first upper annular member projecting above the lower annular member and being detachably secured to the upper portion of the lower annular member by a removable spacer assembly, which provides circumferentially extending passages for the flow of cooling air from the ambient atmosphere between the lower annular member and the first upper annular member to the tubular film, said removable spacer assembly comprising a series of circumferentially spaced securing devices each extending from the first upper annular member to the lower annular member and each carrying an annular spacer thereon to maintain said radially spaced relationship.

2. An air ring according to claim 1 also including a second upper annular member surrounding an upper portion of the first upper annular member in radially spaced relationship therewith, said second upper annular member projecting above the first upper annular member and being detachably secured to the upper portion of the first upper annular member by a further removable spacer assembly, which provides circumferentially extending passages for the flow of cooling air from the ambient atmosphere between the first upper annular member and the second upper annular member to the tubular film, said further removable spacer assembly comprising a spacer ring secured to one of the members and a series of circumferentially spaced securing devices securing the spacer ring to the other member, each securing device extending from the other member to the spacer ring and carrying an annular spacer thereon to maintain radially spaced relationship between the other member and the spacer ring.

3. An air ring for supplying cooling air to an extruded tubular plastic film after the film has been extruded from an annular extruder die at an elevated temperature, said air ring comprising:

a lower annular member securable to an annular extruder die so as to surround extruded tubular plastic film as the film leaves the extruder die, said lower annular member having at least one passage therethrough for supplying cooling air from the exterior thereof to a lower portion of the tubular film, a first upper annular member surrounding an upper portion of the lower annular member in radially spaced relationship therewith, said first upper annular member projecting above the lower annular member and being detachably secured to the upper portion of the lower annular member by a removable spacer assembly, which provides circumferentially extending passages for the flow of cooling air from the ambient atmosphere between the lower annular member and the first upper annular member to the tubular film, and a second upper annular member surrounding an upper portion of the first upper annular member in radially spaced relationship therewith, said second upper annular member projecting above the first upper annular member and being detachably secured to the upper portion of the first upper annular member by a further removable spacer assembly, which provides circumferentially extending passages for the flow of cooling air from the ambient atmosphere between the first upper annular member and the second upper annular member to the tubular film, said further removable spacer assembly comprising a spacer ring secured to one of the members and a series of circumferentially spaced securing devices securing the spacer ring to the other member, each securing device extending from the other member to the spacer ring and carrying an annular spacer thereon to maintain radially spaced relationship between the other member and the spacer ring.

* * * * *